United States Patent
Schwartz

(10) Patent No.: US 12,518,305 B2
(45) Date of Patent: Jan. 6, 2026

(54) NON-FUNGIBLE TOKEN MANAGEMENT SYSTEMS AND METHODS FOR AN ENTERTAINMENT VENUE

(71) Applicant: Universal City Studios LLC, Universal City, CA (US)

(72) Inventor: Justin Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 239 days.

(21) Appl. No.: 18/225,584

(22) Filed: Jul. 24, 2023

(65) Prior Publication Data

US 2024/0037615 A1     Feb. 1, 2024

Related U.S. Application Data

(60) Provisional application No. 63/392,417, filed on Jul. 26, 2022.

(51) Int. Cl.
| | |
|---|---|
| *G06Q 30/0601* | (2023.01) |
| *G06Q 20/38* | (2012.01) |

(52) U.S. Cl.
CPC ....... *G06Q 30/0601* (2013.01); *G06Q 20/387* (2013.01)

(58) Field of Classification Search
None
See application file for complete search history.

(56) References Cited

U.S. PATENT DOCUMENTS

| | | | |
|---|---|---|---|
| 8,056,802 B2* | 11/2011 | Gressel | G07C 9/27 235/382 |
| 9,818,109 B2 | 11/2017 | Loh | |
| 10,505,726 B1 | 12/2019 | Andon et al. | |
| 10,778,438 B2 | 9/2020 | Shi et al. | |
| 11,113,754 B2* | 9/2021 | Andon | H04L 9/0643 |
| 11,610,451 B2 | 3/2023 | Bruno et al. | |
| 11,652,605 B2* | 5/2023 | Turner | H04L 9/3263 380/37 |
| 11,734,902 B2* | 8/2023 | Malik | G06T 19/006 345/633 |
| 11,979,490 B2* | 5/2024 | Basu | G06Q 20/223 |
| 12,259,962 B1* | 3/2025 | Warnick | G06F 21/45 |

(Continued)

OTHER PUBLICATIONS

PCT/US2023/028599 International Search Report and Written Opinion mailed 11SEP2023.

(Continued)

*Primary Examiner* — Nicholas D Rosen
(74) *Attorney, Agent, or Firm* — Fletcher Yoder, P.C.

(57) ABSTRACT

A token management system for an entertainment venue includes a processing system with one or more processors and memory storing instructions executable by the processing system. The instructions are executable by the processing system to cause the processing system to identify a digital token possessed by a user, to access one or more permissions stored in association with the digital token, and to determine information about the user. Additionally, the instructions are executable by the processing system to cause the processing system to enable one or more actions for the digital token in response to determining that the information complies with the one or more permissions stored in association with the digital token.

20 Claims, 5 Drawing Sheets

(56) References Cited

U.S. PATENT DOCUMENTS

| | | | |
|---|---|---|---|
| 2008/0191009 A1* | 8/2008 | Gressel | H04W 4/021 |
| | | | 235/382 |
| 2014/0164251 A1* | 6/2014 | Loh | G06Q 20/065 |
| | | | 705/67 |
| 2015/0302393 A1* | 10/2015 | Poole | G06Q 20/40 |
| | | | 705/65 |
| 2017/0193592 A1* | 7/2017 | Avidan | G06Q 10/087 |
| 2018/0130050 A1 | 5/2018 | Taylor et al. | |
| 2020/0153632 A1* | 5/2020 | Shi | H04L 9/3297 |
| 2020/0184547 A1 | 6/2020 | Andon et al. | |
| 2021/0110390 A1* | 4/2021 | Janaudy | G06Q 20/4016 |
| 2021/0383644 A1* | 12/2021 | Bruno | G06Q 20/321 |
| 2022/0172221 A1* | 6/2022 | Bhattiprolu | H04L 9/50 |
| 2022/0173893 A1 | 6/2022 | Basu et al. | |
| 2022/0253846 A1* | 8/2022 | Tobb | G06V 30/418 |
| 2022/0271915 A1* | 8/2022 | Turner | H04L 9/3247 |
| 2022/0343328 A1* | 10/2022 | Fowler | G06Q 30/0631 |
| 2022/0392176 A1* | 12/2022 | Malik | H04W 4/029 |
| 2022/0414551 A1* | 12/2022 | Derr | G06Q 10/02 |
| 2023/0009904 A1* | 1/2023 | Tägtström | G06V 20/52 |
| 2023/0186299 A1* | 6/2023 | Huggins | H04L 63/105 |
| | | | 705/44 |
| 2023/0195855 A1 | 6/2023 | Mavromatis et al. | |
| 2023/0230075 A1* | 7/2023 | Aiello | H04L 63/102 |
| | | | 705/75 |
| 2023/0368189 A1* | 11/2023 | Ambrose | H04L 9/50 |
| 2024/0013200 A1* | 1/2024 | Singh | H04L 9/50 |

OTHER PUBLICATIONS

Pitchforth, Jegar, "5 Ways Theme Parks Could Embrace Blockchain (And Why They Should)," CoinDesk, May 16, 2017, https://www.coindesk.com/tech/2017/05/16/5-ways-theme-parks-could-embrace-blockchain-and-why-they-should/.

* cited by examiner

NON-FUNGIBLE TOKEN MANAGEMENT SYSTEMS AND METHODS FOR AN ENTERTAINMENT VENUE

CROSS-REFERENCE TO RELATED APPLICATION

This application claims priority to and the benefit of U.S. Provisional Application No. 63/392,417, entitled "NON-FUNGIBLE TOKEN MANAGEMENT SYSTEMS AND METHODS FOR AN ENTERTAINMENT VENUE," filed Jul. 26, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Entertainment venues, such as theme parks, amusement parks, movie theaters, stadiums, concert halls, and the like, provide guests with various immersive experiences. The entertainment venues may include attractions (e.g., movies, plays, rides, games) that provide the guests with the immersive experiences. For example, traditional ride attractions may include ride vehicles that carry the guests at high speeds along a path, and traditional show attractions may include animated characters that perform shows for the guests. As entertainment venues become increasingly popular, the guests have increased expectations for improvements and changes to the immersive experiences.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In an embodiment, a token management system for an entertainment venue includes a processing system with one or more processors and memory storing instructions executable by the processing system. The instructions are executable by the processing system to cause the processing system to identify a digital token possessed by a user, to access one or more permissions stored in association with the digital token, and to determine information about the user. Additionally, the instructions are executable by the processing system to cause the processing system to enable one or more actions for the digital token in response to determining that the information complies with the one or more permissions stored in association with the digital token.

In an embodiment, a method of operating a token management system includes identifying, using a processing system, a digital token possessed by a user and stored on a distributed ledger. The method also includes accessing, using the processing system, one or more permissions stored on the distributed ledger in association with the digital token. The method further includes determining, using the processing system, information about the user. The method further includes facilitating, using the processing system, one or more actions for the digital token in response to determining that the information complies with the one or more permissions stored in association with the digital token.

In an embodiment, a token management system for an entertainment venue includes a processing system with one or more processors and memory storing instructions executable by the processing system. The instructions are executable by the processing system to cause the processing system to identify a first digital token possessed by a first user located within the entertainment venue, determine a first location of the first user within the entertainment venue, and generate a first user geofence that surrounds the first user based on the first location of the first user within the entertainment venue. Additionally, the instructions are executable by the processing system to cause the processing system to output a graphical user interface (GUI) on a display screen of a respective user device carried by a second user located within the entertainment venue, wherein the GUI indicates the first digital token and a map with a boundary representative of the first user geofence.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
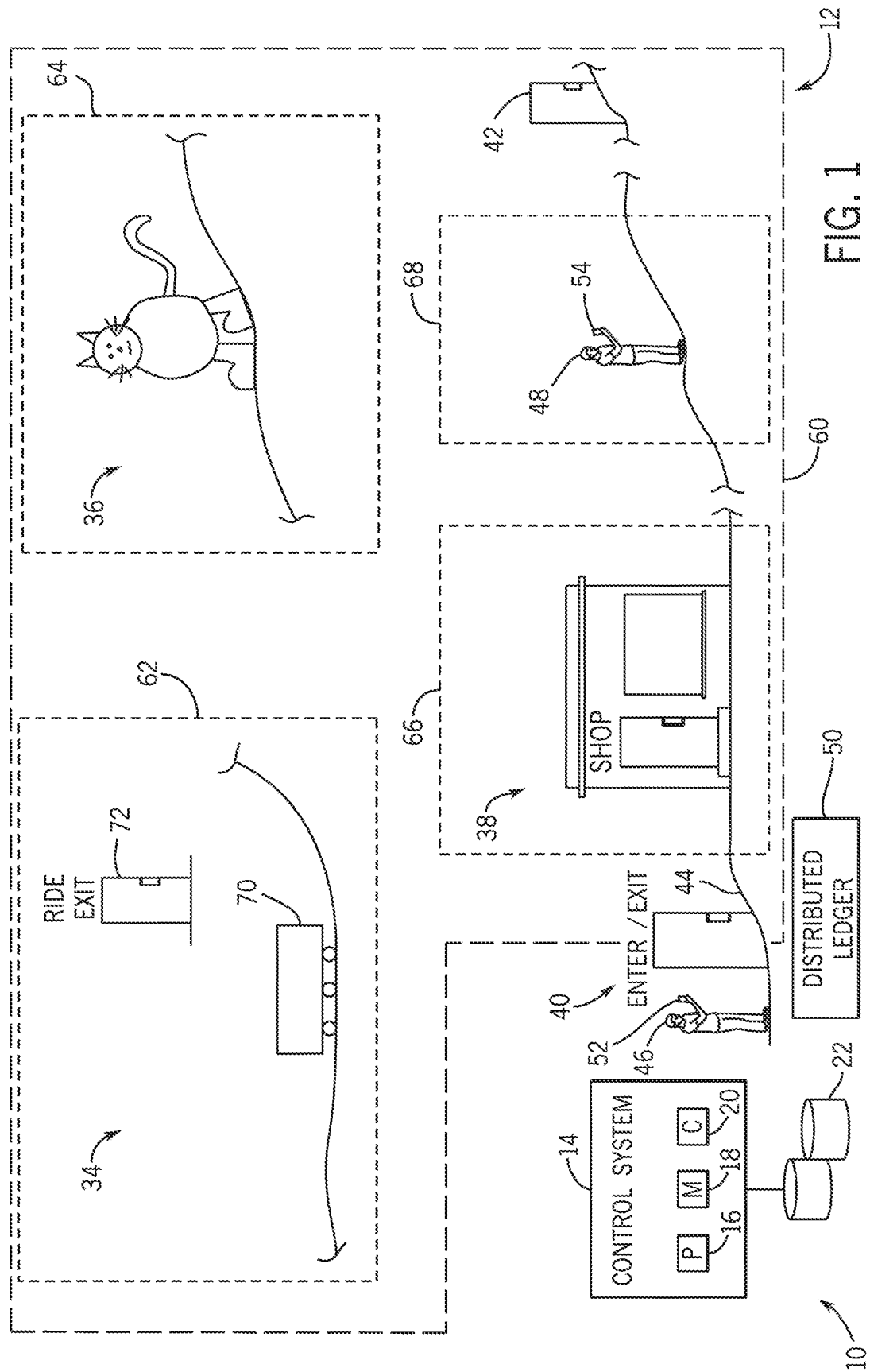
FIG. 1 is a schematic diagram of a non-fungible token (NFT) management system for an entertainment venue, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is presently recognized that guests may want to have records of their achievements in an entertainment venue (e.g., completion of a ride attraction in the entertainment venue; purchase of a souvenir in the entertainment venue). However, physical records (e.g., physical objects, such as printed photographs and/or toy prizes) may be lost, broken, and/or cumbersome to carry throughout the entertainment venue. Furthermore, certain types of digital records may be inauthentic and/or forged. Accordingly, present embodiments may advantageously provide digital, verifiable tokens (e.g., non-fungible tokens [NFTs], which may include digital artworks, digital collectible items, and/or data records) to the guests to mark their achievements in the entertainment venue. Additionally, it is presently recognized that the guests may want to take other actions, such as to buy, sell, and/or trade their NFTs and/or compete using their NFTs, as they visit the entertainment venue.

The digital, verifiable tokens, referred to herein as NFTs, are units of data that may be stored in a distributed ledger (e.g., blockchain). Each NFT is unique and/or non-interchangeable, such that a unique identity and ownership can be confirmed (e.g., verified). This may impart a feeling of ownership over the NFT in a manner that is similar to a feeling of ownership over a physical object, but as noted above, the NFT may not be lost, broken, and/or cumbersome to carry throughout the entertainment venue. Indeed, one or more NFTs (e.g., any number of NFTs, such as 1, 2, 3, 4, 5, more than 10, more than 100) may be stored in the distributed ledger and accessible from a respective digital wallet of the guest. The NFT may also have other advantages (e.g., as compared to the physical object), such as that the NFT may also be easily transferred to other guests (e.g., via a digital marketplace). It should be appreciated that the NFTs may be stored in a storage device or location other than the distributed ledger (e.g., in addition to the distributed ledger; not stored on the distributed ledger; the NFTs refers to digital tokens that are not stored on the distributed ledger). Further, it should be appreciated that the generation of the NFTs and/or transactions with the NFTs may be published on the distributed ledger.

With the foregoing in mind, the present disclosure relates generally to non-fungible token (NFT) management systems and methods for entertainment venues (e.g., theme parks, amusement parks, movie theaters, stadiums, concert halls). More particularly, the present disclosure relates to NFT management systems and methods that establish rules (e.g., permissions and/or restrictions) for one or more NFT actions for one or more NFTs and/or that apply the rules to manage the one or more NFT actions for the one or more NFTs. The rules may permit the guests to carry out certain NFT actions under certain conditions and/or block the guests from carrying out certain NFT actions under certain conditions. For example, the NFT actions may include transferring (e.g., buying, trading, selling, redeeming, and/or gifting) NFTs, and the rules may permit the guests to transfer (e.g., buy, trade, sell, redeem, and/or gift) their NFTs when the guests are present within the entertainment venue and/or in response to completion of certain tasks within the entertainment venue. In some embodiments, the NFT actions may include enrollment in a competition, such as a game competition with other guests. Various types and/or layers of rules may be provided to create a dynamic, immersive NFT experience for the guests of the entertainment venue. Thus, the NFT management system may manage the NFTs (e.g., permit and/or restrict the NFT actions related to the NFTs) to enhance the experience for the guests of the entertainment venue. While the examples presented herein reference NFTs as one implementation to facilitate discussion, it should be appreciated that the present techniques may be implemented with any digital tokens (e.g., digital token system, such as a digital token-based buy, trade, sell, redeem, and/or gift system; not stored in the distributed ledger).

With the foregoing in mind, FIG. 1 is a schematic diagram of a non-fungible token (NFT) management system 10 for an entertainment venue 12, in accordance with an aspect of the present disclosure. The NFT management system 10 includes a control system 14 (e.g., electronic control system) that includes a processor(s) 16, a memory device(s) 18, and a communication device(s) 20. The NFT management system 10 also includes a database(s) 22 that stores data (e.g., information), and the control system 14 may include or be communicatively coupled to the database(s) 22.

The entertainment venue 12 may include one or more attractions. As shown, the entertainment venue 12 includes multiple attractions, such as a ride attraction 34, an animated character attraction 36, and/or a retail and/or restaurant attraction 38 (e.g., store). The entertainment venue 12 may also include an access area 40 (e.g., entrance and/or exit), a kiosk(s) 42, and/or a path(s) 44. A guest 46 (e.g., a user) may enter the entertainment venue 12 through the access area 40 and then travel along the path(s) 44 to reach the various attractions 34, 36, 38. The guest 46 may also travel along the path(s) 44 to reach the kiosk(s) 42. As the guest 46 travels along the path(s) 44 and visits the various attractions 34, 36, 38 and/or the kiosk(s) 42, for example, the guest 46 may approach and/or pass by one or more other guests, represented in FIG. 1 by other guest 48 (e.g., other user).

The guest 46 may possess and/or obtain one or more NFTs, which may be stored in a distributed ledger 50 (e.g., blockchain) and are accessible via a respective digital wallet of the guest 46. For example, the guest 46 may obtain the one or more NFTs at different locations in the entertainment venue 12 (e.g., during prior visits and/or a current visit). Additionally or alternatively, the guest 46 may obtain the one or more NFTs in any of a variety of other ways, such as by watching a particular movie at home, purchasing a ticket online, and/or completing other achievements related to and/or unrelated to the entertainment venue 12. In an embodiment, an application (e.g., software application; associated with the entertainment venue 12) on a respective guest device 52 (e.g., a user device; carried, such as held or worn, by the guest 46; a mobile phone, tablet, watch, toy, wand, and/or band) may include or provide access to the respective digital wallet of the guest 46. Further, the other guest 48 may possess and/or obtain one or more NFTs in a similar way, and the one or more NFTs may also be stored in the distributed ledger 50 and are accessible via a respective digital wallet of the other guest 48. As may be appreciated, the application on a respective guest device 54 (e.g., a user device) may include or provide access to the respective digital wallet of the other guest 48. In one embodiment, one or more NFTs that are shown in the respective digital wallets accessed via the application may be limited to and/or filtered to include only certain NFTs possessed by the guests 46, 48 (e.g., owned by, assigned to, and/or stored in respective digital wallets associated with the guests 46, 48), such as only NFTs obtained in the entertainment venue 12 and/or otherwise related to the entertainment venue 12.

In an embodiment, the guests 46, 48 (and/or other guests) may travel to various locations (e.g., physical locations; different attractions) to collect their NFTs. For example, the guests 46, 48 may use their respective guest devices 52, 54 to view a map that shows the NFTs that are available at each of the various locations. Then, when the guests 46, 48 reach a particular one of the various locations, the guests 46, 48 may use their respective devices 52, 54 to scan a scannable code (e.g., a quick response (QR) code, a bar code, an alphanumeric code) and/or otherwise log their presence at the particular one of the various locations (e.g., via a global positioning system; via communication between a radiofrequency identification tag and a reader; via keyed inputs) to enable the control system 14 to grant one or more NFTs to the guests 46, 48. For example, the map may guide the guest 46 to the ride attraction 34, and the guest 46 may be granted ownership of a ride completion NFT (e.g., a data record that shows completion of the ride attraction 34) by scanning a respective scannable code on a ride vehicle 70 and/or on a wall near an exit 72 of the ride attraction 34. Similarly, the map may guide the other guest 48 to the animated character attraction 36, and the other guest 48 may be granted ownership of a cat NFT (e.g., digital artwork of a cat) by scanning a respective scannable code on an animated character and/or a wall of the animated character attraction 36. The guests 46, 48 may obtain any number of other NFTs, such as 1, 2, 3, 4, 5, more than 10, more than 100, and so on. It should be appreciated that the NFTs may each have respective levels of rarity and/or may be unique. For example, most guests who visit the animated character attraction 36 may receive the cat NFT that includes digital artwork of a blue cat; however, some guests (e.g., one guest per time period, such as one guest per day or per year) who visit the animated character attraction 36 may receive the cat NFT that includes digital artwork of a gold cat. Similarly, the ride completion NFT may be unique by storing a name or other unique identifier of the guest 46 as part of the data record. As noted, the present techniques may be implemented with any digital tokens, which may be obtained by the guests 46, 48 as described herein (e.g., via achievements) and/or may be accessible via respective digital wallets and/or electronic device(s) of the guests 46, 48 (e.g., without being stored on any distributed ledger).

In one embodiment, the control system 14 may assign and/or set the rules (e.g., permissions and/or restrictions) for each NFT at the time of generating (e.g., creating, making available, and/or minting) the NFT for the guest 46. Further, in one embodiment, the rules for the NFT may be incorporated into terms of a smart contract that is tied to the NFT itself (e.g., a blockchain contract stored with the NFT on the distributed ledger 50). The rules may establish permissions and/or restrictions for NFT actions for the NFT. For example, the rules may include a geotag (e.g., a time and/or a place) for each of the one or more NFT actions for the NFT. As a more specific example, the rules for the ride completion NFT may establish that the ride completion NFT may be transferred anywhere, but that the cat NFT may only be transferred within the entertainment venue 12. Further, the one or more NFTs (e.g., with the smart contract) may be linked to an application to enable specific functions, such as certain actions within the entertainment venue 12. For example, the application may include a software application and/or an application associated with the entertainment venue 12. For example, the application may be an application on a respective guest device 52 (e.g., a user device; carried, such as held or worn, by the guest 46; a mobile phone, tablet, watch, toy, wand, and/or band). In some embodiments, the one or more NFTs (e.g., with a smart contract) may be disconnected from the application to enable other functions, such as certain actions outside of the entertainment venue 12. The application may provide the ability to transfer and/or complete other NFT actions with the one or more NFTs without complicated addresses, as any of the NFTs of all local guests (e.g., in the entertainment venue 12 or other designated area) may be identified and visible through the application to facilitate such actions.

It is envisioned that the rules may be the same or different for each NFT (e.g., for each NFT obtained in the entertainment venue 12). Further, various layers of rules may be applied to the NFTs. In an embodiment, for each NFT, the NFT may be transferred only in a certain location(s) (e.g., geofence(s)) and/or at a certain time(s) (e.g., time(s) or time range(s)). For example, the NFT may be considered to be linked to a location, such as linked to the entertainment venue 12. When the NFT is linked to the location, the NFT may be transferred and/or used in competitions only at the location (e.g., the NFT may not be transferred and/or used in competitions outside of the location). Similarly, as another example, the NFT may be considered to be linked to the location, such as linked to the entertainment venue 12, for some period of time (e.g., 2 years). In such cases, the NFT may be transferred and/or used in competitions only at the location during the period of time. However, after the period of time, the NFT may be unlinked from the location and transferred and/or used in competitions at an additional location (e.g., at any location). In this way, the permissions and/or restrictions may be limited in time and may automatically expire at some designated time after generating the NFT (e.g., after creating, making available, and/or minting the NFT; after the guest 46 obtains the NFT).

In an embodiment, the permissions and/or the restrictions may reset upon each trade, purchase, and/or other transfer and/or action involving the NFT (e.g., NFT action(s)). For example, the control system 14 may generate (e.g., provide, create, make available, mint) the NFT for the guest 46 with a link to the entertainment venue 12 for two years. Then, if the NFT is transferred from the guest 46 to the other guest 48 at some later time (e.g., several days or months later), there may be a reset to link the NFT to the entertainment venue 12 for two years from a date of the transfer (e.g., trade). However, in other embodiments, the permissions and/or the restrictions may not reset upon each trade, purchase, and/or other transfer and/or action involving the NFT. For example, the control system 14 may generate the NFT for the guest 46 with a link to the entertainment venue 12 for two years. Then, when the NFT is transferred from the guest 46 to the other guest 48 at some later time (e.g., several days or months later), the NFT only remains linked for the remainder of the two years after the date of generating the NFT for the guest 46. As noted herein, the rules, including the rules related to the reset, may be included as terms of the smart contract so that the rules are accessible and applied according to the terms of the smart contract.

As another example, if the NFT is transferred (e.g., to the entertainment venue 12; redeemed) by the guest 46 to access a priority line (e.g., for one of the attractions 34, 36, 38), there may be a reset to change the permissions and/or the restrictions for the NFT. Further, completion of any NFT action(s) for one NFT of the guest 46 may cause a reset and/or other change to the permissions and/or the restrictions for one or more other NFTs of the guest 46 and/or the other guest 48. For example, if the NFT is transferred by the guest 46 to access the priority line, there may be a reset and/or other change to make the one or more other NFTs of the guest 46 and/or the other guest 48 unavailable for (e.g., restricted from) transfer for access to the priority line. In an embodiment, all permissions and/or restrictions for the NFT may reset upon each trade, purchase, and/or other transfer and/or action involving the NFT. It should be appreciated that the NFT may be redeemed in various manners, such as by actual transfer of the NFT to the entertainment venue 12 (e.g., such that the guest 46 no longer possesses the NFT) and/or by presenting the NFT to the entertainment venue 12 (e.g., the guest 46 retains possession of the NFT, but the permissions and/or the restrictions may be reset or altered as a result).

As noted, the present techniques may be implemented with any digital tokens, which may be associated with permissions and/or restrictions as described herein (e.g., stored in association with the digital tokens in a database and/or a look-up table). In such cases, the control system 14 may determine and/or apply the permissions and/or the restrictions to affect transfers and/or other actions with the digital tokens.

In an embodiment, the permissions and/or the restrictions may relate to achievements. For example, certain permissions may be granted in response to the guest 46 reaching certain achievements and/or certain restrictions may be applied until the guest 46 reaches certain achievements. Thus, certain NFT actions may be permitted in response to the guest 46 reaching certain achievements and/or certain NFT actions may be restricted (e.g., blocked) until the guest 46 reaches certain achievements. The achievements may include a threshold number of visits (e.g., ten total visits; two more visits) to the entertainment venue 12. For example, the guest 46 may obtain the NFT with restrictions (e.g., restrictions on some or all purchases, sales, and/or trades) until the guest 46 reaches the threshold number of visits. Then, in response to the guest 46 reaching the threshold number of visits, the NFT may be unlocked and allowed to be used according to its permissions at that time (e.g., while unlocked; different permissions; transfers and/or other actions).

The achievements may include various other achievements, alone or in combination. For example, the achievements may include a threshold number of rides completed at the entertainment venue 12, completion of a particular ride in the entertainment venue 12, a threshold number of characters visited at the entertainment venue 12, interaction with a particular character in the entertainment venue 12, a threshold number of total linear feet of ride tracks/paths traveled, a threshold total amount of money spent on purchases, purchase of a ticket to visit the entertainment venue 12, attendance at a show or performance, attendance or experience of a part of a show or performance, and so forth. As noted, the permissions and/or the restrictions may be incorporated into a smart contract (e.g., included in terms of a smart contract, which is immutably stored with the NFT in a distributed ledger 50). For example, the smart contract may include terms that call for the NFT to be locked to the entertainment venue 12 for at least some time, such as locked to the entertainment venue 12 until the guest 46 visits the entertainment venue 12 on ten separate days (e.g., in the future, after the guest 46 obtains the NFT). Thereafter, the NFT may be unlocked from the entertainment venue 12 to transfer and/or complete other actions outside of the entertainment venue 12. It should be appreciated that certain permissions may be granted for the NFTs of the guest 46 in response to one or more other guests reaching certain achievements and/or certain restrictions may be applied for the NFTs of the guest 46 until one or more other guests reach certain achievements. For example, certain NFT actions for the NFTs of the guest 46 may be permitted in response to the other guest 48 reaching certain achievements and/or certain NFT actions for the NFTs of the guest 46 may be restricted (e.g., blocked) until the other guest 48 reaches certain achievements. It should be appreciated that achievements may be utilized to lock and/or unlock the digital tokens in a similar manner (e.g., via the permissions and/or the restrictions stored in associated with the digital tokens; via processing carried out by the control system 14).

Further, entry into the entertainment venue 12 may enable the guest 46 with the NFTs to enroll (or cause automatic enrollment of the guest 46) in a competition with the one or more other guests that have NFTs in the entertainment venue 12. The control system 14 may identify respective NFTs of the guest 46 and the one or more other guests in the entertainment venue 12, and then select a winner (or winners) of the competition based on one or more factors or techniques (e.g., respective rankings of the respective NFTs, a random drawing, or some combination thereof). For example, the guest 46 and the one or more other guests may be present in the entertainment venue 12. Further, the guest 46 may have the gold cat NFT, while the one or more other guests may each have their own blue cat NFT. Accordingly, the control system 14 may select the guest 46 as the winner of the competition due to the gold cat NFT of the guest 46 having a higher ranking that the blue cat NFTs of the one or more other guests, and the control system 14 may provide a notification to the guest 46 and/or some reward (e.g., a reward NFT, such as a medal).

The control system 14 may select the winner (or winners) of the competition at certain times, such as periodically (e.g., every hour, such as for all guests who are currently in the entertainment venue 12 at that time; at the end of every day or at park closing) and/or in response to certain events (e.g., after entry of a threshold number of guests in the entertainment venue, such as for every 100 guests or the first 100 guests). In this way, the competition may allow the guest 46 and the one or more other guests to understand and/or receive indications of the respective rankings of their NFTs, as well as enjoy winning rewards and/or recognition upon being selected as the winner (or winners) of the competition. It should be appreciated that the NFT actions disclosed herein may include the competitions and/or the permissions or rules disclosed herein may relate to or establish eligibility for the competitions. It should be appreciated that the digital tokens may be utilized for enrollment in a competition in a similar manner (e.g., while the guest 46 is in the entertainment venue 12; select the winner with a highest ranking digital token in the entertainment venue 12).

Additional features related to accessing and applying the rules are described in detail herein. The control system 14 may communicate with respective guest devices 52, 54 of the guests 46, 48 to access the respective digital wallets to identify that and/or detect if the guests 46, 48 are in possession of certain NFTs that have certain rules. In one embodiment, the control system 14 may establish and/or access a venue geofence 60, which may generally align with a boundary of the entertainment venue 12 and/or surround the entertainment venue 12. The control system 14 may also apply the rules for one or more NFTs actions based on the venue geofence 60. In particular, certain NFT actions may be permitted outside of the venue geofence 60, certain NFT actions may be restricted outside of the venue geofence 60, certain NFT actions may be permitted inside of the venue geofence 60, and/or certain NFT actions may be restricted inside of the venue geofence 60. For example, the guest 46 may carry the respective guest device 52 outside of the venue geofence 60, such as to a residence, a work place, and so forth. In an embodiment, when the guest 46 carries the respective guest device 52 outside of the venue geofence 60, the guest 46 may not use the respective guest device 52 to transfer (e.g., obtain, buy, sell, trade, redeem, and/or gift) and/or compete with at least some of their NFTs (e.g., NFTs that were previously issued in the entertainment venue 12). However, when the guest 46 carries the respective guest device 52 into the entertainment venue 12, the guest 46 may be able to use the respective guest device 52 to transfer (e.g., obtain, buy, sell, trade, and/or redeem) and/or compete with certain NFTs. In an embodiment, the guest 46 may not use any device that is outside of the venue geofence 60 to transfer (e.g., obtain, buy, sell, trade, and/or redeem) and/or compete with at least some of their NFTs (e.g., NFTs that were previously issued in the entertainment venue 12). However, the guest 46 may be able to use any device that is inside of the venue geofence 60, such as the kiosk(s) 42, to transfer (e.g., obtain, buy, sell, trade, and/or redeem) and/or compete with certain NFTs. With respect to the digital tokens, the control system 14 may access and apply the rules for the digital tokens in this manner (e.g., block the transfer and/or enrollment in competitions with any device that is outside of the venue geofence 60, and enable the transfer and/or enrollment in competitions with any device that is inside of the venue geofence 60).

For example, the guest 46 may have a horse NFT (e.g., digital artwork of a horse) that they earned during a prior visit to the entertainment venue 12. The guest 46 may not be able to take any NFT actions with respect to the horse NFT using the respective guest device 52 outside of the venue geofence 60, but may be able to take at least some NFT actions with respect to the horse NFT using the respective guest device 52 inside of the venue geofence 60. This may encourage the guest 46 to return to the entertainment venue 12, such as to interact with the other guest 48 to trade the horse NFT for another NFT possessed by the other guest 48, to trade the horse NFT for another NFT generated by and/or awarded by the entertainment venue 12, to transfer (e.g., redeem) the horse NFT at to the entertainment venue 12 in exchange for some reward of value (e.g., monetary value; a discounted ticket for entry to the entertainment venue 12, an interactive experience in the entertainment venue), and so forth.

Further, the control system 14 may establish or access additional geofences within the entertainment venue 12, such as a ride attraction geofence 62 associated with a ride attraction 34, an animated character attraction geofence 64 associated with the animated character attraction 36, and a retail and/or restaurant attraction geofence 66 associated with a retail and/or restaurant attraction 38. The control system 14 may also establish or access a respective geofence around one or more other guests, such as a respective guest geofence 68 around other guest 48. As the guest 46 travels around the entertainment venue 12, the control system 14 may apply permissions and/or the restrictions for one or more NFT actions for one or more NFTs possessed by the guest 46. That is, the control system 14 may enable the one or more NFT actions when information about the guest 46 complies with the permissions established by the rules and/or may block the one or more NFT actions when the information about the guest 46 does not comply with the permissions established by the rules. The information about the guest 46 may comply with the permissions established by the rules when the information satisfies, matches, or corresponds to the permissions established by the rules. For example, in response to the guest 46 being detected within the venue geofence 60, the control system 14 may enable (e.g., output instructions to) the application to display (e.g., visually display and/or output instructions to visually display) the one or more NFTs possessed by the guest 46 and may enable the guest 46 to access an NFT marketplace to buy, sell, and/or trade NFTs. In response to the guest 46 being detected within the venue geofence 60, the control system 14 may enable the guest 46 to transfer any of their NFTs, only some of their NFTs, or none of their NFTs. For example, the guest 46 may have a fish NFT (e.g., a digital image of a fish obtained upon completion of an interaction with a fish animated character during a prior visit to the entertainment venue 12) and a purchase completion NFT (e.g., a data record that shows a purchase of a physical collector's item). The permissions and/or the restrictions may establish that the guest 46 may transfer the fish NFT anywhere within the venue geofence 60, but may only transfer the purchase completion NFT within a different, non-overlapping, and/or more limited area, such as the ride attraction geofence 62 for a place in a priority line to access the ride attraction 34. It should be appreciated that this may be accomplished in any suitable manner, such as via display of an access code (e.g., alphanumeric code readable by an attendant and/or operator; scannable code, such as a barcode and/or QR code) that is presented via the application on the guest device 52 to allow access to the priority line to access the ride attraction 34. As another example, this may be accomplished by completing a transaction at a kiosk 42 at an entry to the priority line for the ride attraction 34.

Thus, the guest 46 may elect to transfer the fish NFT via the NFT marketplace (e.g., to trade to the other guest 48 via the NFT marketplace) soon after passing through the access area 40. In one embodiment, the control system 14 may instruct display of a notification on the respective guest device 52 in response to any changes in the permissions and/or the restrictions for the one or more NFT actions. For example, the control system 14 may instruct the notification to indicate "Welcome! Some of your NFTs have been unlocked." In this way, the control system 14 may alert the guest 46 and prompt the guest 46 to begin permitted NFT actions. Additionally, in response to the guest 46 being detected within the venue geofence 60, the guest 46 with the NFTs may enroll or be automatically enrolled in a competition with the one or more other guests that have NFTs within the venue geofence 60. It should be appreciated that the guest 46 with the NFTs may enroll or be automatically enrolled in such competition in response to the guest 46 being detected within any designated geofence, such as the ride attraction geofence 62, the animated character attraction geofence 64, the retail and/or restaurant attraction geofence 66, and/or the respective guest geofence 68. The control system 14 may select a winner or winners as set forth herein.

In response to the guest 46 being detected within the ride attraction geofence 62, the control system 14 may apply the appropriate permissions and/or restrictions on the one or more NFT actions. In particular, certain NFTs may be linked to the ride attraction geofence 62. In such cases, the certain NFTs may be locked outside of the ride attraction geofence 62 (e.g., cannot complete one or more NFT actions) and may be unlocked while the guest 46 is detected within the ride attraction geofence 62 (e.g., can complete one or more NFT actions). For example, the guest 46 may transfer (e.g., redeem) the purchase completion NFT to obtain a benefit with respect to the ride attraction 34. The benefit may include a priority line pass for the ride attraction 34 (e.g., allows the guest 46 to wait in a standby or shorter priority line), an enhanced experience in the ride attraction 34 (e.g., a faster ride vehicle and/or more immersive lighting and/or audio effects), and so forth. As noted herein, the guest 46 may obtain access to the priority line for the ride attraction 34 via any of a variety of processes. Similarly, the guest 46 may receive the enhanced experience in the ride attraction 34 via any of a variety of processes, such as via communication with the respective guest device 52 to access the respective digital wallet of the guest 46 as the guest 46 travels through the ride attraction 34. The guest 46 may also be able to trade a previously obtained ride completion NFT for a new ride completion NFT and/or modify the previously obtained ride completion NFT, such as to reflect an accurate number of ride completions. It should be appreciated that the ride attraction geofence 62 may generally surround the ride attraction 34 or certain portions of the ride attraction 34, such as a waiting area where guests wait to board a ride vehicle 70 of the ride attraction 34 and/or the exit 72.

The guest 46 may then travel from the ride attraction 34 to the animated character attraction 36. In response to the guest 46 being detected within the animated character attraction geofence 64, the control system 14 may apply the appropriate permissions and/or restrictions on the one or more NFT actions. In particular, certain NFTs that were locked outside of the animated character attraction geofence 64 may be unlocked while the guest 46 is detected within the animated character attraction geofence 64. For example, the control system 14 may set the permissions and/or the restrictions so that the guest 46 may only transfer one or more NFTs within the animated character attraction geofence 64. In one embodiment, the guest 46 may be able to transfer (e.g., redeem) one or more NFTs within the animated character attraction geofence 64 to obtain a benefit with respect to the animated character attraction 36. The benefit may include a priority line pass to interact with the animated character attraction 36 (e.g., allows the guest 46 to wait in a standby or shorter priority line), an enhanced experience in the animated character attraction 34 (e.g., a longer interaction and/or more immersive audio effects), and so forth. The guest 46 may also be able to trade one NFT for another NFT and/or modify one NFT, such as to reflect an accurate number of animated character interactions. It should be appreciated that the animated character attraction geofence 64 may generally surround the animated character attraction 36, which may be movable about the entertainment venue 12. For example, the animated character attraction 36 may include an animated character (e.g., a robot; a human performer wearing a costume) that travels (e.g., walks, rolls) around the entertainment venue 12. In such cases, the animated character attraction geofence 64 may change locations as the animated character travels around the entertainment venue 12.

In response to the guest 46 being detected within the retail and/or restaurant attraction geofence 66, the control system 14 may apply the appropriate permissions and/or restrictions on the one or more NFT actions. For example, the control system 14 may set the permissions and/or the restrictions so that the guest 46 may only transfer certain NFTs within the retail and/or restaurant attraction geofence 66. In one embodiment, the guest 46 may be able to transfer (e.g., redeem) the certain NFTs to obtain a benefit with respect to the retail and/or restaurant attraction 38. The benefit may include a priority line pass for the retail and/or restaurant attraction 38 (e.g., allows the guest 46 to wait in a standby or shorter priority line), an enhanced experience in the retail and/or restaurant attraction 38 (e.g., an enhanced or secret menu, a discount and/or coupon applied to a purchase), and so forth. It should be appreciated that the retail and/or restaurant attraction geofence 66 may generally surround the retail and/or restaurant attraction 38 or certain portions of the retail and/or restaurant attraction 38, such as a dining area and/or a particular merchandise area (e.g., of a particular theme, such as a theme of a particular character (e.g., a theme of a particular superhero)).

In response to the guest 46 being detected within the respective guest geofence 68 around the other guest 48, the control system 14 may apply the appropriate permissions and/or restrictions on the one or more NFT actions. For example, the control system 14 may set the permissions and/or the restrictions so that the guest 46 may only transfer (e.g., buy, sell, trade, redeem, gift) the certain NFTs while the guest 46 is within the respective guest geofence 68. In one embodiment, the guest 46 may be able to view the NFTs that are available to buy and/or receive (e.g., via purchase, trade, gift) when the guest 46 is in the respective guest geofence 68 around the other guest 48 (e.g., the NFTs possessed by the other guest 48). Each guest, including the guest 46, may also have a respective guest geofence. Thus, as the guests travel throughout the entertainment venue 12, they pass in and out of each other's guest geofences and become eligible for certain NFT actions and/or restricted from certain NFT actions, accordingly. For example, the guest 46 may only be able to transfer (e.g., buy, sell, trade, receive, and/or gift) NFTs with the other guest 48 when the guest 46 is within the respective guest geofence 68 of the other guest 48, and vice versa. In an embodiment, the guest 46 may only be able to transfer (e.g., buy, sell, trade, receive, and/or gift) NFTs with other guests who are also located within the venue geofence 60 (e.g., and not with individuals who are located outside of the venue geofence 60). In this way, the guest 46 and the other guests who are located at the entertainment venue 12 at a particular time may be permitted to transfer and/or exchange their NFTs with one another, which creates a dynamic NFT marketplace based on the guests who are currently located within the entertainment venue 12. With respect to the digital tokens, the control system 14 may access and apply the rules for the digital tokens in this manner (e.g., permit transfer and/or other actions as the guest 46 travels in and out of the various geofences 60, 62, 64, 66, 68).

In one embodiment, the guest 46 may also obtain one or more NFTs within the respective guest geofence 68. These one or more NFTs may only be available within the respective guest geofence 68, and may include NFTs possessed by the other guest 48 and/or NFTs generated (e.g., created, made available, minted) due to proximity between the guests 46, 48. For example, if the guest 46 has the horse NFT, and the other guest 48 has the fish NFT, the control system 14 may generate a new NFT based on the horse NFT and the fish NFT. For example, the new NFT may be a horse covered with fish scales NFT to represent a fusion NFT based on the horse NFT and the fish NFT. In one embodiment, the guest 46 and/or the other guest 48 may both receive the new NFT. Further, the control system 14 may generate the new NFT without any input from the guest 46 and/or the other guest 48, and this may be done automatically in response to the guests 46, 48 being in proximity to one another (e.g., within their geofences). However, in one embodiment, the guest 46 and/or the other guest 48 may provide input to select the NFTs that they want to use to generate the new NFT and/or input to select how they want to combine their NFTs to generate the NFT. In some such cases, the guest 46 may provide their input to generate a respective new NFT (e.g., a horse with a fish tail) and the other guest 48 may provide their input to generate a respective new NFT (e.g., the horse covered in fish scales). It should be appreciated that the respective guest geofence 68 may generally surround the other guest 48, such as a circular area centered around the other guest 48. Additionally, it should be appreciated that the guest 46 may be within multiple geofences at one time, such as within multiple respective geofences of multiple other guests at one time, the respective guest geofence 68 of the other guest 48 and the ride attraction geofence 62 of the ride attraction 34 at one time, and so forth. Thus, the guest 46 may have access to various other NFTs at one time, have access to various new NFTs (e.g., fusion NFTs) at one time, and/or be subject to various different rules at one time. Further, the guest 46 may be within different geofences over time (e.g., as the guest 46 travels through the entertainment venue 12) so that the guest 46 may have access to various other NFTs over time, have access to various new NFTs (e.g., fusion NFTs) over time, and/or be subject to various different rules over time. The digital tokens may also be combined in this manner (e.g., to create fusion digital tokens).

As the guest 46 travels through the entertainment venue 12, the guest 46 may stop at the kiosk(s) 42 to carry out certain NFT actions. For example, the kiosk(s) 42 may be located in different themed areas of the entertainment venue 12, and the kiosks(s) 42 provide different NFTs based on their respective themed areas (e.g., one kiosk 42 in a superhero section may provide superhero-related NFTs, while another kiosk 42 is an outer space section may provide space-related NFTs). Thus, as shown in FIG. 1, the guests (including the guest 46 and/or the other guest 48) may travel around the entertainment venue 12 to collect different NFTs (e.g., at different attractions, from different guests, and/or from the kiosk(s) 42) and/or to carry out various NFT actions according to the permissions and/or restrictions set by the control system 14.

It should be appreciated that the present techniques may utilize the control system 14 to monitor the location of the respective guest device 52 associated with the guest 46 (e.g., considered to represent the location of the guest 46; to detect the guest 46 within the one or more geofences 60, 62, 64, 66, 68). Similarly, the control system 14 may monitor the location of the respective guest device 54 associated with the other guest 48 (e.g., considered to represent the location of the other guest 48), and so on for other guest devices. This may be accomplished via communication between the communication device(s) 20 of the control system 14 and respective communication devices in the respective guest devices 52, 54. In one embodiment, the respective guest devices 52, 54 may include global positioning systems (GPS) that provide GPS coordinates of the locations of the respective guest devices 52, 54. In one embodiment, the respective guest devices 52, 54 may include wireless communication devices that communicate with transceivers and/or readers in the entertainment venue 12, to thereby indicate the locations of the respective guest devices 52, 54 within the entertainment venue 12. In any case, the control system 14 may compare the locations of the respective guest devices 52, 54 to the geotag(s) in the smart contract for the NFT. If the locations match the geotag(s), then the permissions are granted. If the locations do not match the geotag(s), then the permissions are not granted. Similarly, the control system 14 may monitor the achievements of the guests, such as via detection of the respective devices 52, 54 at the exits of the ride attractions (e.g., which may indicate completion of the ride attractions) and other suitable techniques. The control system 14 may carry out these steps in implementations with the digital tokens (e.g., to monitor the location of the guests 46, 48; compare the locations of the respective guest devices 52, 54 to the geotag(s) stored in the database).

The processor(s) 16 may include a microprocessor, which may execute software to manage aspects of the NFT management system 10. The processor(s) 16 may include multiple microprocessors, one or more "general-purpose" microprocessors, one or more special-purpose microprocessors, and/or one or more application specific integrated circuits (ASICs), or some combination thereof that form a processing system. For example, the processor(s) 16 may include one or more reduced instruction set computer (RISC) processors. The memory device(s) 18 may include volatile memory, such as random access memory (RAM), and/or nonvolatile memory, such as read-only memory (ROM). The memory device(s) 18 may store information, such as control software, look up tables, configuration data, communication protocols, or the like.

For example, the memory device(s) 18 may store processor-executable instructions including firmware or software for the processor(s) 16 to execute, such as instructions to manage aspects of the NFT management system 10 (e.g., instructions that, when executed by the processing system, cause the processing system to carry out steps described herein, such as to block one or more NFT actions according to permissions and/or restrictions and/or such as to instruct blocking of the one or more NFT actions according to the permissions and/or the restrictions). In an embodiment, the memory device(s) 18 is a tangible, non-transitory, machine-readable media that may store machine-readable instructions for the processor(s) 16 to execute. The memory device(s) 18 may include ROM, flash memory, hard drives, any other suitable optical, magnetic, or solid-state storage media, or a combination thereof. The communication device(s) 20 may facilitate communication (e.g., wireless communication) with other features, such as the database(s) 22, the distributed ledger 50, the respective guest devices 52, 54, the transceivers/readers in the entertainment venue 12, and so forth.

The control system 14 may establish the permissions and/or restrictions for the NFTs, as well as instruct generation (e.g., creation, provision, minting) of new NFTs in the entertainment venue 12 (e.g., with the permissions and/or restrictions in the smart contract associated with the respective NFT). The control system 14 may also manage prompts and/or notifications provided via the application on the respective guest devices 52, 54, manage access to the respective digital wallets via the application on the respective guest devices 52, 54, manage access to and/or transactions on the NFT marketplace via the application on the respective guest devices 52, 54, track achievements of the guests in the entertainment venue 12, manage experiences in the entertainment venue 12 (e.g., instructions to adjust the ride attraction based on NFTs possessed by and/or redeemed by the guest for enhanced experiences), and/or manage other aspects of the techniques disclosed herein. It should be appreciated that the control system 14 may be a distributed computing system and/or include a cloud computing system. Indeed, the techniques disclosed herein may be implemented via geofenced smart contracts without any centralized management system. For example, the geofenced smart contracts may contain code with the permissions, restrictions, and/or parameters of the geofences, and the respective guest devices 52, 54 may use telemetry and access other data to identify their location relative to the geofences and apply the permissions and/or restrictions accordingly. Accordingly, the processing system (e.g., processing circuitry) may refer to or include the processor(s) and/or any other processor(s) that are suitable to carry out the techniques disclosed herein, and processing steps or operations may be distributed between processing components (e.g., the processor(s) 16 and/or any other processor(s)) of the processing system (e.g., one processor 16 performs all steps; or one processor of the processors 16 performs one step, another processor of the processors 16 performs another step, and so on).

Additionally, it should be appreciated that the entertainment venue 12 may not be a single area within a single boundary or geofence, but instead may include multiple physically separate areas (e.g., a theme park in one city, a restaurant outside adjacent to a theme park, a movie theatre in another city) with their own respective geofences. Thus, the one or more NFTs may be obtained by the guests in any of the multiple physically separate areas based on achievements in any of the multiple physically separate areas (e.g., the guest receives an NFT after visiting both a theme park and a movie theater). Similarly, the one or more NFTs obtained in one of the geofences (e.g., at the ride attraction 34; at the theme park) may have its permissions set to allow (e.g., to only allow) use in another one of the geofences (e.g., at the animated character attraction 36; at the movie theatre), such as to obtain access to the priority line and/or to trade within another guest.

Figure 2:
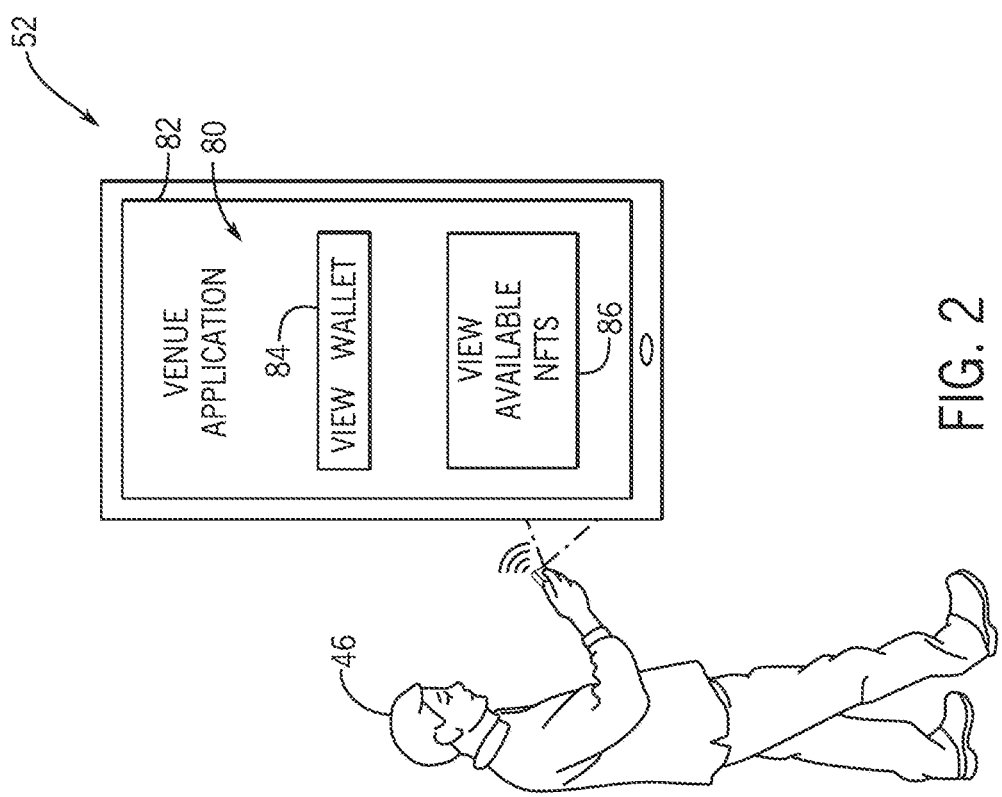
FIG. 2 illustrates an example of a graphical user interface (GUI) on a display screen of a guest device, wherein the GUI presents selectable icons to view a digital wallet of the guest and to view NFTs that are available to the guest in the entertainment venue, in accordance with an aspect of the present disclosure.

Additional features of the NFT management system 10 of FIG. 1 may be understood with reference to example graphical user interfaces (GUIs) shown in FIGS. 2-6. In particular, FIG. 2 illustrates an example of a GUI 80 on a display screen 82 of a guest device, which is shown as the guest device 52 to facilitate discussion. The GUI 80 presents selectable icons, such as a first selectable icon 84 to view a digital wallet of the guest 46 and a second selectable icon 86 to view NFTs that are available to the guest 46 in the entertainment venue. The GUI 80 may be presented on the display screen 82 in response to the guest 46 opening an application (e.g., software application) on the guest device 52. The application may be associated with the entertainment venue and may enable the guest 46 to carry out other tasks, such as to reserve dining and/or view wait times for rides. Further, when the guest device 52 is detected as being within the venue geofence, the GUI 80 may include additional information, such as text that states "Welcome to the entertainment venue" and/or "Enjoy a dynamic NFT experience—different NFT actions will be unlocked as you visit different areas of the entertainment venue." In implementations with the digital tokens, the GUI 80 may present this information related to the digital tokens.

Figure 3:
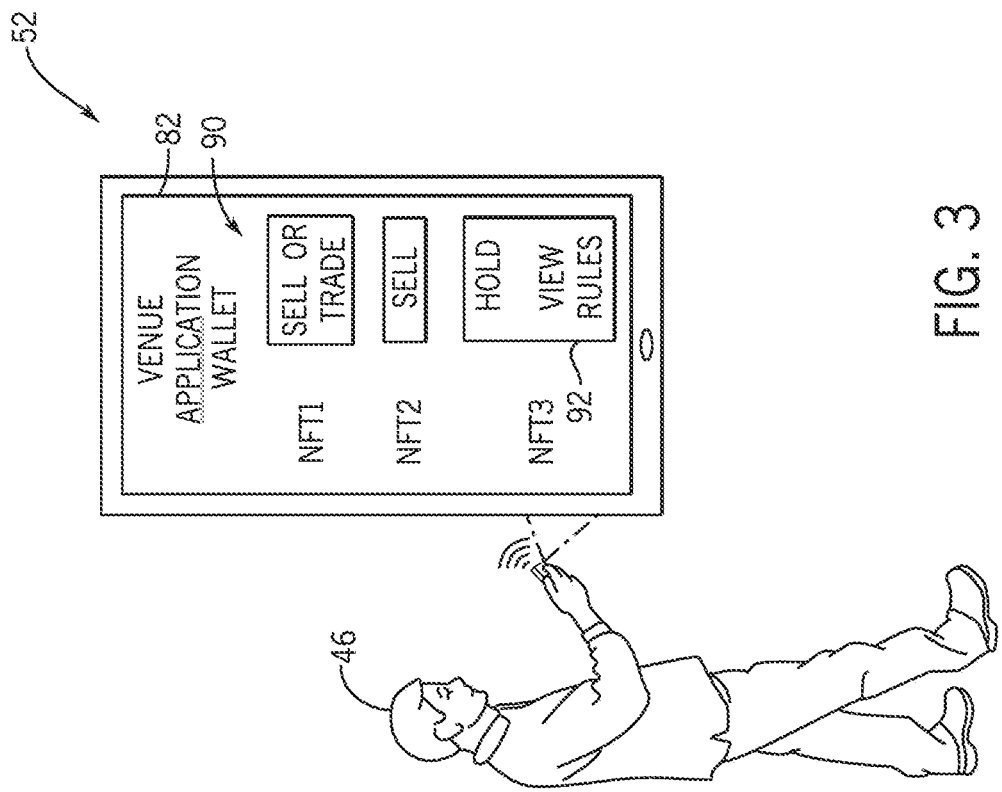
FIG. 3 illustrates an example of a GUI on the display screen of the guest device, wherein the GUI presents NFT actions that are available for the NFTs in the digital wallet of the guest, in accordance with an aspect of the present disclosure.

FIG. 3 illustrates an example of a GUI 90 on the display screen 82 of the guest device 52, wherein the GUI 90 presents the NFT actions that are available for the NFTs in the digital wallet of the guest 46. The GUI 90 may be presented on the display screen 82 of the guest device 52 in response to selection of the selectable icon 84 of FIG. 2. As discussed herein, the permissions and/or restrictions for each NFT may be set when the NFT is generated and may be embedded in the terms of the smart contract associated with the NFT. For example, the permissions and/or restrictions for each NFT may be set when the NFT is minted (e.g., stored on the distributed ledger) and may be embedded in the terms of the smart contract associated with the NFT (e.g., stored with the NFT on the distributed ledger).

As shown in FIG. 3, the NFTs may have different permissions and/or restrictions (e.g., unique to the NFT). For example, a first NFT ("NFT 1") may be eligible for trading or selling at the location of the guest device 52 (e.g., inside of the entertainment venue geofence), while a second NFT ("NFT 2") may only be eligible for selling at the location of the guest device 52. Further, a third NFT ("NFT 3") may not be eligible for any NFT actions. In such cases, the GUI 90 may include an indication that the third NFT is on hold and/or a selectable icon 92 to enable the guest 46 to view the permissions and/or restrictions for the third NFT. For example, selection of the selectable icon 92 may cause display of a time remaining until the third NFT is unlocked for NFT actions (e.g., two weeks), a ride that should be completed (e.g., ridden by the guest 46) to unlock the NFT actions, a show or part of a show that should be attended and/or experienced to unlock the NFT actions, an amount of money that should be spent to unlock the NFT actions, another NFT that should be obtained to unlock the NFT actions (e.g., visit the animated character attraction to obtain the cat NFT to unlock the NFT actions for the horse NFT; move into a respective guest geofence of another guest with a particular NFT to unlock the NFT actions), and so forth depending on the permissions and/or restrictions for the third NFT. In this way, the GUI may then guide the guest 46 to satisfy the terms of the smart contract to unlock the NFT actions for the NFT. It should be appreciated that some or all of the permissions and/or restrictions for all NFTs may be the same (e.g., all actions can only be carried out in the entertainment venue geofence for a period of two years after generating, and thereafter can be carried out anywhere). In implementations with the digital tokens, the GUI 90 may present this information related to the digital tokens.

Figure 4:
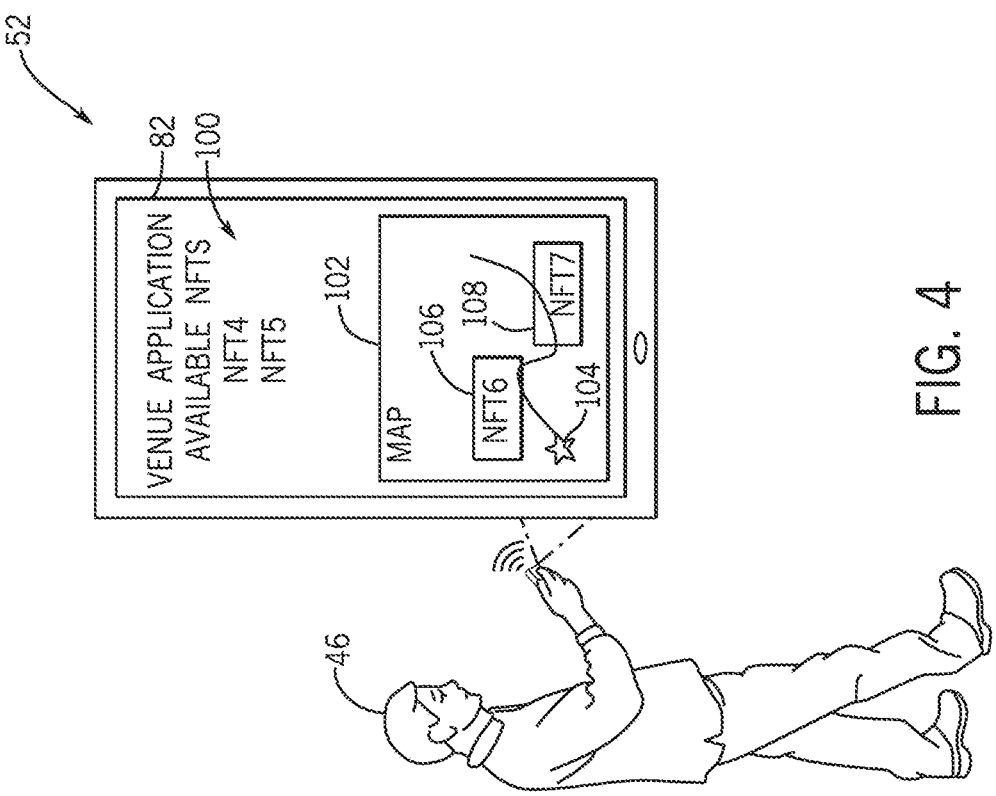
FIG. 4 illustrates an example of a GUI on the display screen of the guest device, wherein the GUI presents a map with geofences that define locations to access the NFTs that are available to the guest in the entertainment venue, in accordance with an aspect of the present disclosure.

FIG. 4 illustrates an example of a GUI 100 on the display screen 82 of the guest device 52, wherein the GUI 100 presents a map 102 with geofences that define locations to access the NFTs that are available to the guest 46 in the entertainment venue. The GUI 100 may be presented on the display screen 82 of the guest device 52 in response to selection of the selectable icon 86 of FIG. 2. In one embodiment, the GUI 100 may include a list of NFTs that are currently available to the guest 46 based on the location of the guest device 52 (e.g., at the access point of the entertainment venue 12), such as a fourth NFT ("NFT 4") and a fifth NFT ("NFT 5"). Further, the GUI 100 may include the map 102 that includes a marker 104 of the location of the guest device 52, as well as a respective boundary 106 of the ride attraction geofence that may be visited to obtain a sixth NFT ("NFT 6"), a respective boundary 108 of a respective guest geofence of the other guest that may be visited to obtain a seventh NFT ("NFT 7"), and so forth. In implementations with the digital tokens, the GUI 100 may present this information related to the digital tokens.

Figure 5:
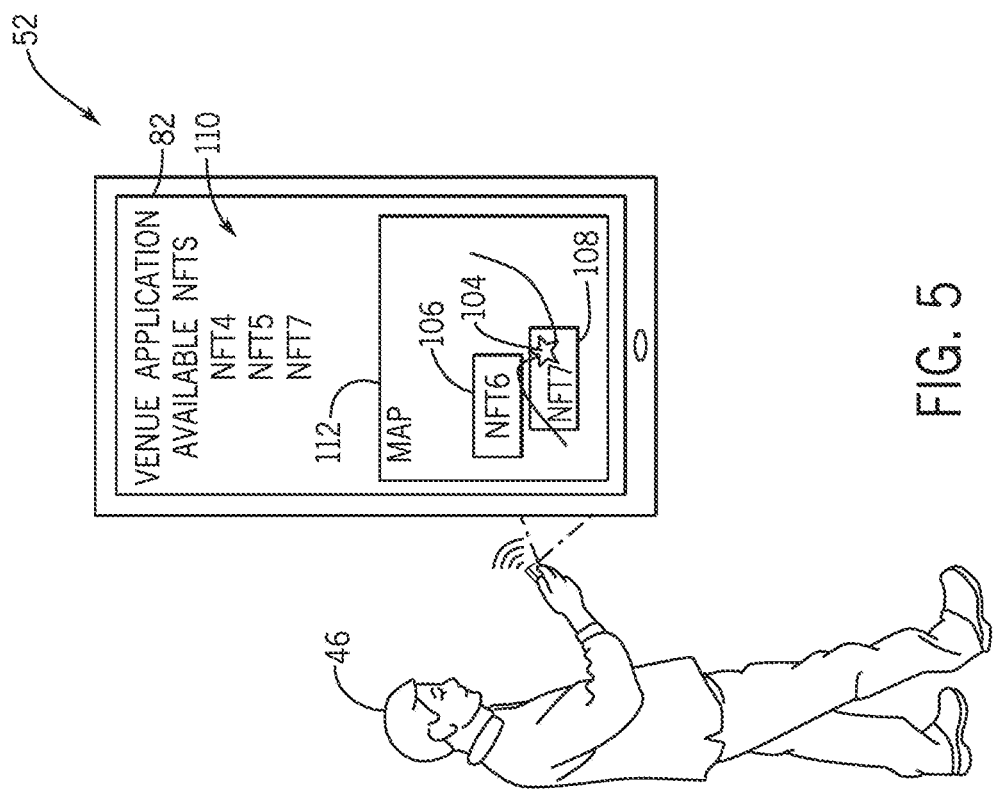
FIG. 5 illustrates an example of a GUI on the display screen of the guest device, wherein the GUI presents an updated map with the geofences that define the locations to access the NFTs that are available to the guest in the entertainment venue, in accordance with an aspect of the present disclosure.

FIG. 5 illustrates a GUI 110 on the display screen 82 of the guest device 52, wherein the GUI 110 presents an updated map 112 with geofences that define the locations to access the NFTs that are available to the guest 46 in the entertainment venue. As shown in FIGS. 4 and 5, the map 102 may be updated to the updated map 112 (e.g., continuously, periodically, in response to input from the guest) to reflect changes in the location of the guest device 52 and/or changes in other features, such as the respective boundary 108 of the respective guest geofence of the other guest as the other guest travels about the entertainment venue. In this way, the guest 46 may view the NFTs that are available in real time (e.g., substantially real-time) and move accordingly to try to obtain the NFTs that they would like to have. In implementations with the digital tokens, the GUI 110 may present this information related to the digital tokens.

Figure 6:
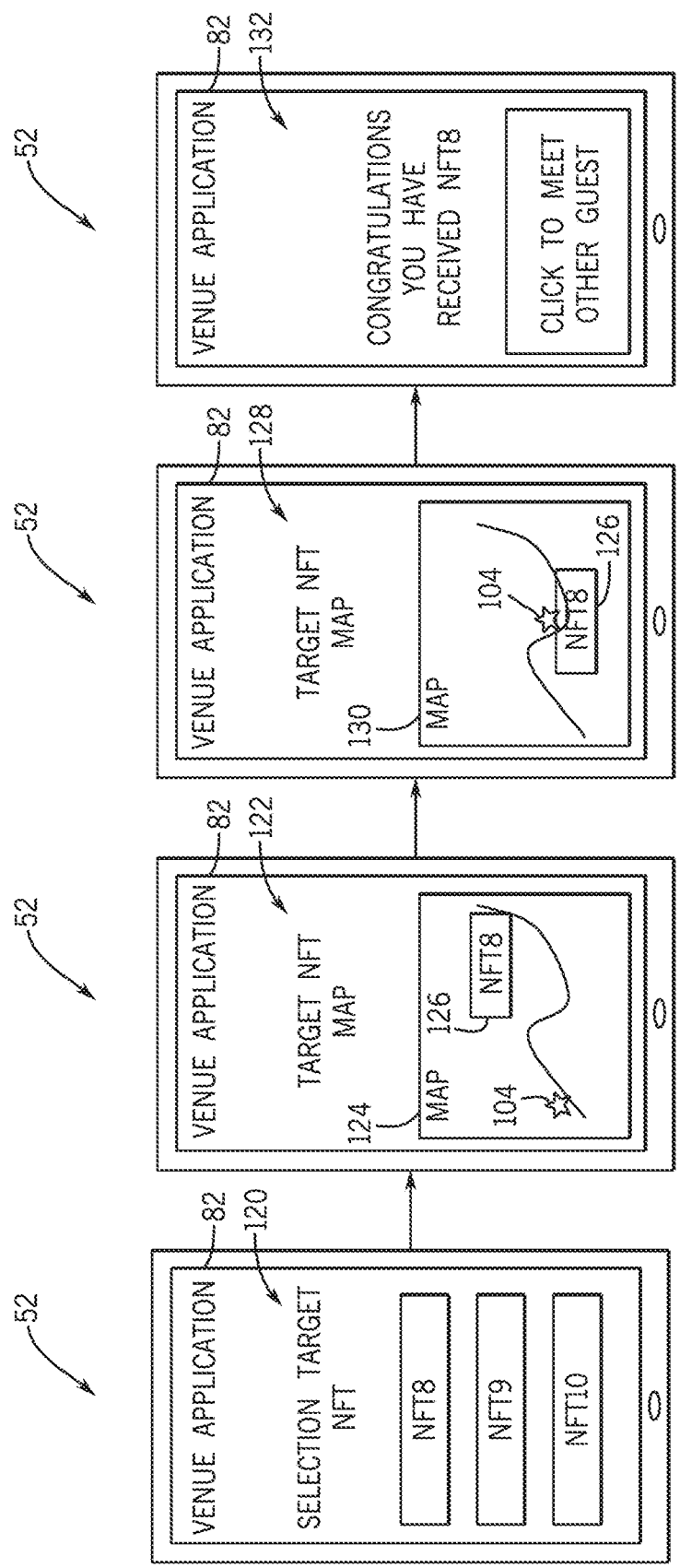
FIG. 6 illustrates a series of GUIs on the display screen of the guest device, wherein the GUIs present selectable icons to select a target NFT and maps with geofences that define the locations to access the target NFT, in accordance with an aspect of the present disclosure.

It should be appreciated that many variations and additional features are envisioned to provide the dynamic NFT experience. For example, FIG. 6 illustrates a series of GUIs on the display screen 82 of the guest device 52, wherein the GUIs present selectable icons to select a target NFT and maps with geofences that define the locations to access the target NFT. In particular, a first GUI 120 includes a list of target NFTs, and the guest may select one of the target NFT from the list of target NFTs. For example, in FIG. 6, the guest may select an eighth NFT ("NFT 8") from the list of target NFTs.

In response to selection of the eighth NFT from the list of target NFTs, a second GUI 122 may be presented on the display screen 82 of the guest device 52. As shown, the second GUI 122 may include a map 124 that includes the marker 104 that represents the location of the guest device 52 and a respective boundary 126 of the respective geofence, which in this case is the respective guest geofence of the other guest that possesses the eighth NFT. The map 124 may update to reflect changes in the location of the guest device 52 and the respective boundary 126. Then, in response to the guest device 52 being detected within the respective geofence that is associated with the eighth NFT, a third GUI 128 may be presented on the display screen 82 of the guest device 52. The third GUI 128 may include an updated map 130 and/or otherwise notify the guest that the guest device 52 has been detected within the respective boundary 126 of the respective geofence, and thus, that the guest is now eligible to obtain (e.g., via a transfer for a fee or without a fee; via a trade) the eighth NFT. It should be appreciated that an additional notification (e.g., pop-up notification) may be presented in a GUI on the respective guest device of the other guest, and the additional notification may indicate that the guest is nearby (e.g., within the respective geofence) and would like to obtain the eighth NFT. In this way, an NFT exchange or interaction may be facilitated between the guest and the other guest in response to the guest being detected within the respective boundary 126 of the respective geofence. For example, if the other guest authorizes the transfer, a fourth GUI 132 may be presented on the display screen 82 of the guest device 52 to notify the guest that they have obtained the eighth NFT.

It should be appreciated that transactions (e.g., NFT actions, such as transfers, purchases, sales, trades, redemptions, gifts, and/or competitions) between guests may be anonymous so that the guest is not alerted to the exact location of the other guest and/or is not provided with sufficient information to clearly identify and/or locate the other guest. For example, the respective guest geofences may be offset slight from the guests or large enough to encompass multiple guests. In some cases, the respective guest geofences may be dynamically adjusted (e.g., made larger or smaller) so as to always encompass multiple guests to help hide the source of the target NFT and/or the transactions. However, in some cases, the guests may want to be identified to meet one another during the transaction. Thus, the additional notification may include an audible alert and/or a visual alert that may be detectable by both the other guest and the guest to assist in identifying one another. Indeed, upon connecting the guests, the guest device 52 and the respective guest device of the other guest may both be instructed to output the audible alert and/or the visual alert (e.g., matching alerts) to assist in identifying one another. The guests may provide inputs (e.g., preferences) related to privacy settings, such as to allow the respective guest geofences to be small enough to help the other guests identify them during transactions, to provide respective markers that more closely represent the guests in the map, and/or to provide the alerts. In implementations with the digital tokens, the transactions may be facilitated in this manner (e.g., selection of a target digital token; the map 124 and/or notifications; anonymous transactions).

It should also be appreciated that the NFT management system may be configured to initiate the transaction between the guest and the other guest in other ways. For example, if the guest sets the target NFT upon entrance to the entertainment venue, travels throughout the entertainment venue, and then is detected to be approaching the exit of the entertainment venue without the target NFT, the NFT management system may create a temporary geofence (e.g., artificial geofence) for the target NFT in a vicinity of the guest to provide an opportunity for the guest to obtain the target NFT or some other similar NFT (e.g., popular NFT or otherwise likely to be desirable to the guest). In this way, the guest may have a positive NFT experience in the entertainment venue. It should be appreciated that the temporary geofence may be generated in any of a variety of circumstances, such as in response to detecting that the guest has been tracking and/or following the respective guest geofence for the target NFT without obtaining the target NFT for some threshold period of time (e.g., one hour, two hours, or more). Similarly, the temporary geofence may be generated in response to detecting that the guest has been tracking and/or following one or more respective guest geofences for one or more target NFTs without riding any rides, visiting any retail and/or restaurant attraction(s), or the like for some threshold period of time (e.g., one hour, two hours, or more). In such cases, the temporary geofence may make it easier and faster for the guest to obtain the target NFT so that the guest can then move onto to other experiences. In an embodiment, after collecting the target NFT, the guest may have to complete other achievements before being eligible for any additional target NFTs possessed by other guests, to thereby encourage the guest to visit the attractions in the entertainment venue. Other circumstances that may result in the temporary geofence may include detection of the respective guest device associated with the target NFT leaving the entertainment venue and so forth. In an embodiment, the guest may select and pursue only one target NFT at any given time, or multiple target NFTs at any given time. It should be appreciated that the temporary geofence may be utilized and provided for the digital tokens as well.

Figure 7:
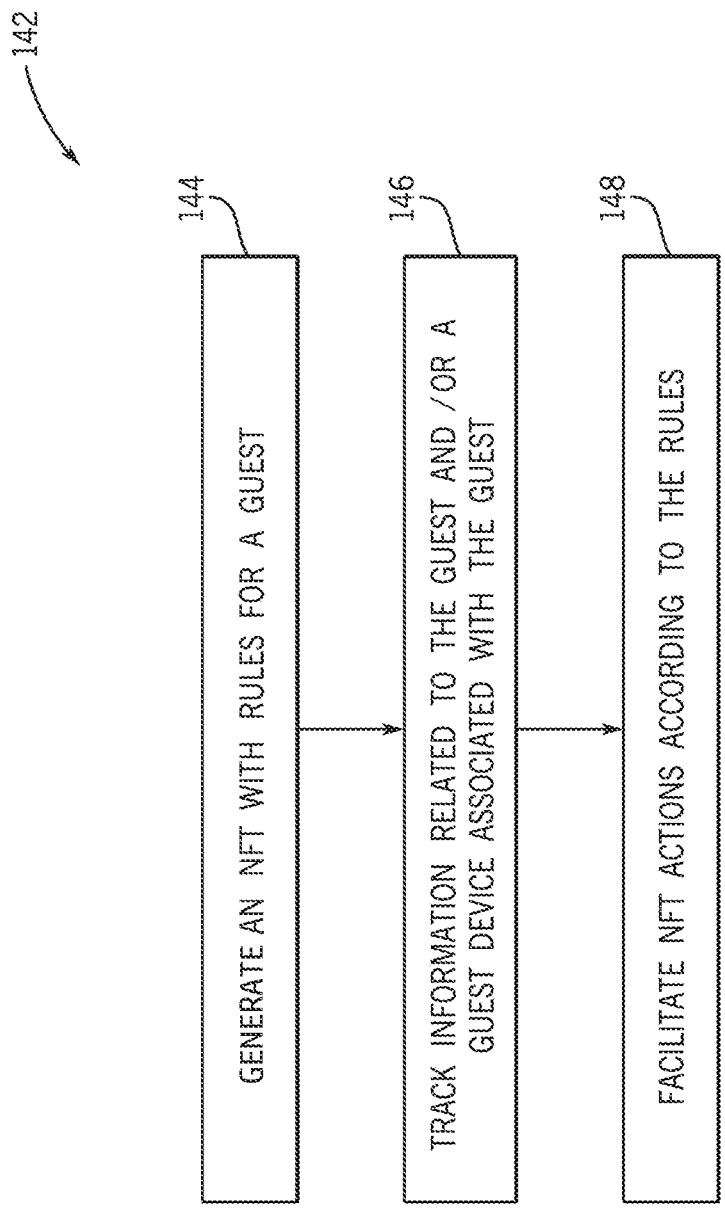
FIG. 7 is a block diagram of a method of managing one or more NFT actions for one or more NFTs using a NFT management system, in accordance with an aspect of the present disclosure.

FIG. 7 is a flow diagram of an embodiment of a method 142 of operating an NFT management system, such as the NFT management system 10 of FIG. 1. The method 142 includes various steps represented by blocks. It should be noted that the method 142 may be performed as an automated procedure by a system, such as the processor(s) of the NFT management system. Although the flow chart illustrates the steps in a certain sequence, it should be understood that the steps may be performed in any suitable order and certain steps may be carried out simultaneously, where appropriate. Further, certain steps or portions of the method 142 may be performed by separate systems or devices.

In block 144, the method 142 may begin by generating an NFT with rules (e.g., permissions and/or restrictions) for a guest in response to an achievement of the guest. For example, the NFT may be generated for the guest in response to the guest scanning a scannable code after completing a ride on a ride attraction, purchasing a ticket to visit an entertainment venue, and so forth. The rules may include geotags that define locations and/or times for one or more NFT actions (e.g., for two years after generating, the NFT may only be traded within the entertainment venue). The NFT may be stored on a distributed ledger, and the rules may be stored as terms in a smart contract on the distributed ledger in association with the NFT.

In block 146, the method 142 may include tracking information related to the guest and/or a guest device of the guest that possesses the NFT. The information may include a location of the guest device, an amount of money spent by the guest in the entertainment venue, and/or any other achievements by the guest.

In block 148, the method 142 may include facilitating permitted NFT actions for the NFT and/or blocking restricted NFT actions for the NFT based on the rules and the information. For example, the guest may open an application on the guest device to access a digital wallet that lists the NFT and any other NFTs possessed by the guest. If there are permitted NFT actions for the NFT, a GUI may present the digital wallet along with an indication of the permitted NFT actions for the NFT. For example, the GUI may include a selectable icon ("Trade") that, if selected, will enable the guest to view and complete transactions via an NFT marketplace.

If there are restricted NFT actions for the NFT, the GUI may present the digital wallet along with an indication of the restricted NFT actions for the NFT. For example, the GUI may include a selectable icon ("Click for achievements required to unlock trade with other guests") that, if selected, will enable the guest to view the restrictions and steps that may be taken by the guest to overcome the restrictions. The steps may include achievements, such as completing a ride attraction, waiting some period of time (e.g., two days), moving to a particular geofenced area of the entertainment venue, and so forth. It should be appreciated that the NFT may have both permitted NFT actions and restricted NFT actions at one time based on the information (e.g., trade with other guests is permitted, but redemption for priority line at the ride attraction is not permitted). Further, each NFT possessed by the guest may have the same or different permissions and/or restrictions.

Smart contracts may also be described as self-executing contracts, blockchain contracts, digital contracts, and/or chain code. As used herein, a smart contract refers to computer programming code executed by a distributed ledger. For instance, smart contracts may refer to distributed programs, or distributed applications that can be used to perform the transactions and recordation in blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. It should be appreciated that the method 142 of FIG. 7 may be implemented with digital tokens that are not stored on the distributed ledger. In such cases, the rules for the digital tokens may be stored in association with the digital tokens in a database (e.g., look-up table), and the rules may be accessed and applied as described herein.

It should be appreciated that any features shown or described with reference to FIGS. 1-7 may be combined in any suitable manner. Further, the various rules described herein may be layered and/or combined in any suitable manner to provide a dynamic NFT experience. Further, the techniques disclosed herein may be applied to other types of digital tokens, including digital tokens that are not NFTs and/or digital tokens that are not stored in the distributed ledger (e.g., other type of digital token system, such as any digital token-based buy, sell, trade system). While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A token management system for an entertainment venue, the token management system comprising:
 a processing system with one or more processors; and
 memory storing instructions executable by the processing system to cause the processing system to:
  identify a digital token possessed by a user;
  access one or more permissions stored in association with the digital token;
  determine information about the user; and
  enable one or more actions for the digital token in response to determining that the information complies with the one or more permissions stored in association with the digital token, wherein the one or more permissions define an achievement of the user that, if completed by the user, unlocks the one or more actions for the digital token.

2. The token management system of claim 1, wherein the token management system is a non-fungible token (NFT) management system and the digital token is a NFT.

3. The token management system of claim 2, wherein the NFT and the one or more permissions are stored in a distributed ledger.

4. The token management system of claim 1, wherein the instructions are executable by the processing system to cause the processing system to block the one or more actions for the digital token in response to determining that the information does not comply with the one or more permissions stored in association with the digital token.

5. The token management system of claim 1, wherein the instructions are executable by the processing system to cause the processing system to identify the digital token possessed by the user via communication with a user device carried by the user in the entertainment venue.

6. The token management system of claim 1, wherein the one or more permissions define a geofence for the one or more actions, the information about the user comprises a location of a user device associated with the user, and the instructions are executable by the processing system to cause the processing system to block the one or more actions for the digital token in response to determining that the location of the user device associated with the user is outside of the geofence.

7. The token management system of claim 1, wherein the instructions are executable by the processing system to cause the processing system to:
 identify completion of the one or more actions for the digital token; and
 adjust, in response to identifying the completion of the one or more actions for the digital token, the one or more permissions for the digital token.

8. The token management system of claim 1, wherein the achievement comprises:
 completion of a number of rides at the entertainment venue;
 completion of a particular ride in the entertainment venue;
 a number of characters visited at the entertainment venue;
 a particular character visited in the entertainment venue;
 a total linear feet of ride paths traveled in the entertainment venue;
 a total amount of money spent on purchases in the entertainment venue;
 a purchase of a ticket to visit the entertainment venue;
 attendance at a show in the entertainment venue;
 experience of a part of a performance in the entertainment venue; or
 any combination thereof.

9. The token management system of claim 1, wherein the instructions are executable by the processing system to cause the processing system to enable the one or more actions for the digital token in response to determining that the information indicates completion of the achievement by the user and thereby complies with the one or more permissions stored in association with the digital token.

10. The token management system of claim 1, wherein the achievement comprises moving to a particular location in the entertainment venue.

11. The token management system of claim 1, wherein the one or more actions for the digital token comprise enrollment in a competition related to the digital token.

12. A method of operating a token management system, the method comprising:
 identifying, using a processing system, a digital token possessed by a user and stored on a distributed ledger;
 accessing, using the processing system, one or more permissions stored on the distributed ledger in association with the digital token, wherein the one or more permissions define a geofence for one or more actions;
 determining, using the processing system, information about the user, wherein the information about the user comprises a location of a user device associated with the user; and
 enabling, using the processing system, the one or more actions for the digital token in response to determining that the location of the user device associated with the user is within the geofence.

13. The method of claim 12, comprising generating the digital token for the user in response to an achievement of the user within an entertainment venue.

14. The method of claim 12, wherein the geofence corresponds to:
 a venue boundary of an entertainment venue;
 an attraction boundary of an attraction in the entertainment venue; or
 a region defined around another user in the entertainment venue.

15. A token management system for an entertainment venue, the token management system comprising:
 a processing system comprising one or more processors; and
 memory storing instructions executable by the processing system to cause the processing system to:
  identify a first digital token possessed by a first user located within the entertainment venue;
  determine a first location of the first user within the entertainment venue;
  generate a first user geofence that surrounds the first user based on the first location of the first user within the entertainment venue; and
  output a graphical user interface (GUI) on a display screen of a respective user device carried by a second user located within the entertainment venue, wherein the GUI indicates the first digital token and a map with a boundary representative of the first user geofence.

16. The token management system of claim 15, wherein the instructions are executable by the processing system to cause the processing system to:
 access one or more respective permissions stored in association with the first digital token; and
 output, in response to determining that the one or more respective permissions permit a transfer of the first digital token at least at the first location of the first user within the entertainment venue, the GUI on the display screen of the respective user device carried by the second user.

17. The token management system of claim 15, wherein the instructions are executable by the processing system to cause the processing system to:
 identify a second digital token possessed by the second user located within the entertainment venue; and
 output, in response to the respective user device carried by the second user being detected within the first user geofence, an additional GUI on a respective display screen of a respective user device carried by the first user located within the entertainment venue, wherein the additional GUI indicates the second digital token.

18. The token management system of claim 15, wherein the instructions are executable by the processing system to cause the processing system to generate the first digital token for the first user based on an achievement of the first user within the entertainment venue.

19. A token management system for an entertainment venue, the token management system comprising:
 a processing system with one or more processors;
 memory storing instructions executable by the processing system to cause the processing system to:
  identify a digital token possessed by a user;
  access one or more permissions stored in association with the digital token;
  determine information about the user; and
  enable one or more actions for the digital token in response to determining that the information complies with the one or more permissions stored in association with the digital token;

identify completion of the one or more actions for the digital token; and adjust, in response to identifying the completion of the one or more actions for the digital token, the one or more permissions for the digital token.

20. The token management system of claim 19, wherein the instructions are executable by the processing system to cause the processing system to adjust, in response to identifying the completion of the one or more actions for the digital token, one or more respective permissions for one or more additional digital tokens possessed by the user, another user, or both.

\* \* \* \* \*